Patented Nov. 22, 1932

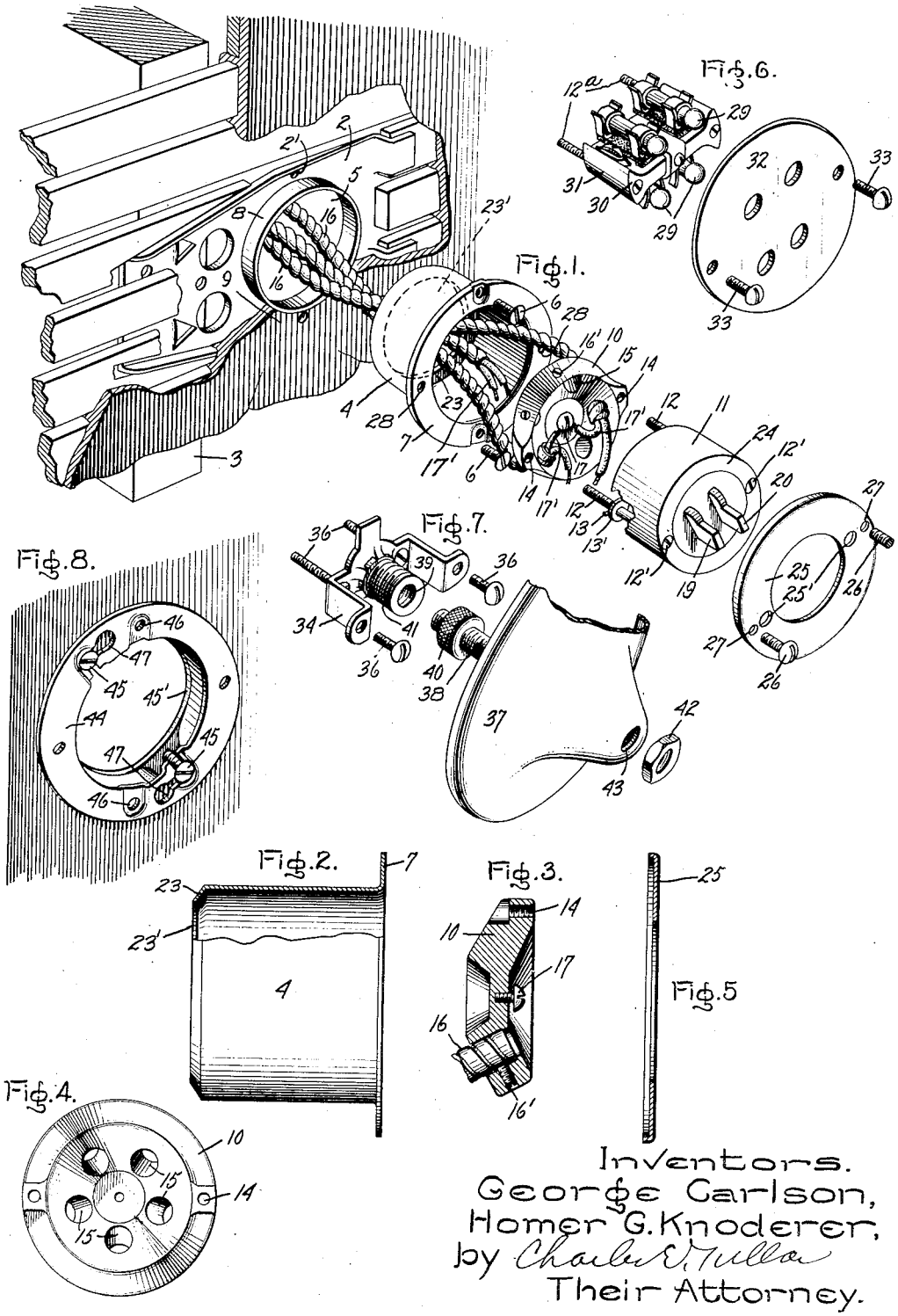

1,888,848

UNITED STATES PATENT OFFICE

GEORGE CARLSON, OF ANSONIA, AND HOMER G. KNODERER, OF FAIRFIELD, CONNECTICUT, ASSIGNORS TO GENERAL ELECTRIC COMPANY, A CORPORATION OF NEW YORK

RECEPTACLE FOR HOUSE WIRING SYSTEMS

Application filed September 11, 1929. Serial No. 391,900.

The invention relates to a wiring system and in particular to a wiring system comprising receptacles for supporting and enclosing electrical wiring devices such as fuse blocks, switches and the like.

In order to increase the demand for and reduce the cost of manufacture, distribution and installation of house wiring systems, such as above indicated, it is essential to standardize as much as possible the elements thereof, such as the receptacles for enclosing the wiring devices of the system, and to so construct the elements that the system can be installed at low cost for labor. Also it is desirable that the receptacles shall be simple in structure and substantially made, and that the system comprise a minimum of parts.

The object of our invention is to provide an improved construction and arrangement of parts for use in a wiring system, and for a consideration of what we believe to be novel and our invention attention is directed to the following specification and the claims appended hereto.

In the drawing, Fig. 1 is an exploded view from the front of a receptacle, its bracket support and one of the wiring devices, a switch block, of the system, adapted to be located in the receptacle; Fig. 2 shows the receptacle in side elevation and in section with the bottom and cover thereof removed; Fig. 3 shows a side view of the bottom of the receptacle in section; Fig. 4 shows the bottom of the receptacle in plan view; Fig. 5 shows a side view of the cover of the device in section; Fig. 6 shows in perspective another one of the wiring devices of the system, a fuse block (which may be substituted for the switch block of Fig. 1) and its corresponding cover; Fig. 7 shows in perspective still another element, a stud bracket or chandelier support and a canopy for the outlet which may be substituted for the switch block, Fig. 1; Fig. 8 shows, in perspective from the front, a form of support for the receptacle different from that in Fig. 1.

Referring more in detail to the drawing, in Fig. 1 there is shown a lath and plaster wall with a bracket 2 secured to the stud 3. The bracket serves to support the receptacle 4, the body of which latter is adapted to be inserted in a compartment 5 of the bracket and secured to said bracket by any suitable means such as, for example, the screws 6 which extend through the flange 7 and engage threaded holes 2', in the bracket 2. When the receptacle 4 is in place, the flange 7 is seated on the rim 8 or on the plaster 9 about said rim or on both. The receptacle has a removable bottom element 10, to which a block or body 11 of insulating material may be secured by suitable means such as screws 12. These screws are free to turn in the block in which they are held against longitudinal movement by pins 13. For convenience, washers 13' are inserted between the block and the pins. As shown, the threaded portion of these screws are adapted to engage the threaded holes 14 in the bottom element 10. Bottom element 10 is provided also with holes 15 arranged about its central axis, which holes are adapted to receive each a cable 16.

In Fig. 1 three such cables 16 are shown, but the number of cables will vary, depending upon the nature of the wiring device secured to the bottom element 10. In Fig. 1 the wiring device is a switch structure comprising two single pole tumbler switches, the operating handles of which are indicated at 19 and 20. The three cables 16 each have two conductors. One cable leads from the source of power to the switch structure and the other two cables lead from the switch structure to the loads. One conductor 17' of each cable is connected to bottom element 10 by means of a screw 17 and the remaining conductor of each cable is connected to terminals of the two tumbler switches, the remaining conductor of the cable 16 which leads from the power line being connected in parallel to the two switches in the usual manner. The armor of the cables is grounded on the bottom element 10 by means of the screws 16' which fasten the cables in the openings in the bottom element 10.

In making the connections to the switch block the cables 16 may be drawn in from behind the wall through the bottom opening 23' in the receptacle 4 to the front of the receptacle, as indicated in Fig. 1, so that the connections may be readily made, as indicated in this figure. After the connections are completed, the block 11 is secured to the bottom element 10 by means of the screws 12. By means of these screws the relative positions of the bottom element 10 and the block 11 with respect to each other may be readily and easily adjusted to fit in the receptacle 4. The bottom element 10 and the switch block are then inserted in the receptacle, the bottom element being seated on the rim 23 about the hole 23' in the bottom of the receptacle, see Fig. 2. In order to properly secure the block and the bottom element 10 in place, a cover, in the form of a ring 25, is applied over the mouth of the receptacle 4 and secured to the flange 7 by suitable means such as the screws 26, which pass through the holes 27 in the cover 25 and engage the threaded holes 28 in the flange 7. Obviously, the top face 24 of the switch block 11 should be flush with the face of the flange 7 before the cover is applied. This relation, as already indicated, is obtained through the medium of the screws 12. In order to enable the same adjustment to be made after the ring 25 is in place and to avoid the necessity of its removal, the ring 25 is provided with perforations 25' through which the heads 12' of the screws 12 may be engaged and turned to wedge the block 11 and the bottom element 10 between the ring and the seat 23, thus insuring a good connection between the receptacle and the bottom element 10. The cover element 25 is provided with a central hole through which switch handles 19 and 20 project.

The receptacle 4 is so constructed and the wiring devices shown in Figs. 6 and 7 are so designed that any one of these units, for example, the fuse block shown in Fig. 6, may be substituted for the switch block 11 in Fig. 1, in which case the screws 12ª, Fig. 6, would engage the holes 14 in the bottom element 10. Inasmuch as the fuse block, Fig. 6, is provided with four fuses 29 which project above the surface 30 of the block 31, this form of device is provided with a cover 32 provided with four holes, one for each fuse, through which the fuse may be withdrawn or inserted. When the block 31 is in place the cover 32 is secured to the flange 7 on the receptacle 4 by means of screws 33.

On the other hand, in place of the switch block 11, the stud bracket 34, Fig. 7, may be substituted, in which case the screws 36 will engage the holes 28 in the flange 7 of the receptacle 4. The bracket, instead of being dropped loosely into the receptacle, as in the case of the blocks 11 and 31, is secured directly to the flange 7 by means of screws 36'. With this arrangement a canopy 37 is used to cover the entire outlet apparatus including the receptacle 4 and its flange 7. The canopy is secured directly to the bracket by means of a threaded pipe 38 which engages the threaded hole 39 in the stud on the bracket. The pipe 38 is provided with a lock nut 40 which engages the threads 41 on the outside of the stud. The canopy 37 is locked against the wall by means of the nut 42 which engages the end of the rod 38 that passes through the hole 43 in the dome of the canopy.

In the foregoing it has been described how the receptacle 4 may be secured to a bracket of the type shown in Fig. 1, which bracket is secured directly to the stud support 3. However, the receptacle 4 may be secured instead to a ring such as ring 44, see Fig. 8, which is applied to a hole in the wall and clamped or secured in any suitable manner thereto, such as for example, by bolts or screws extending through holes 45, which latter are anchored to the wall in any suitable manner, such as for example by brace 45' located at the rear of the wall. In applying the receptacle 4 to a support such as that shown in Fig. 8, the flange 7 is secured to the ring 44 by means of screws 6, which are adapted to engage the threaded holes 46 located in suitable depressions in the ring 44. Flange 7 is provided with depressions for receiving the heads of the screws 6, so that they may remain flush with the top surface of the flange 7, thus enabling covers, such as the covers 25 and 32, Figs. 1, 5 and 6, to fit closely on the flange. It is convenient in installing the ring 44 to insert the screws 45 in place beforehand, allowing them to project in front of the wall a distance greater than the thickness of the ring 44. Therefore, the ring 44 is provided with holes 47 large enough to allow the heads of the screws to pass through the ring when the ring is being applied to the holder. The ring is then turned in a clockwise direction in order to bring the neck of the screws into the slots extending from the holes 47 after which the screws are tightened and the ring 44 thus clamped to the wall.

It will be seen, therefore, that the invention contemplates a receptacle which is adapted to be inserted in a compartment in a wall, the receptacle being provided with a removable bottom element 10 to which any one of the various types of wiring devices adapted for use in a wiring system may be applied. The wiring device and the bottom element of the receptacle are then slipped in place in the receptacle and covered with a suitable form of cover. With the form of construction shown it is possible to easily make all the wiring connections between the cables behind the wall and the wiring devices that are to be located in the receptacle by drawing the cable ends forward into the open in front of the receptacle. After the connections are made the cables are pushed back and the bottom element and wiring device are inserted in place in the receptacle and there secured. If a wiring device becomes defective it may be removed readily and a new one substituted without very much labor and in a very short interval of time.

The construction insures complete protection by grounding one side of the circuit and by grounding all of the exposed parts of the apparatus. The bottom element 10 is grounded to the armor of the cable 16, see Fig. 3, (or to several such cables) by means of screws 16' (or by a number of such screws). The conductor 17' of each cable on the grounded side of the circuit is connected to the bottom element 10 by means of the screw 17 and the bottom element 10 is maintained in good electrical contact with the receptacle 4, the bottom element 10 and the block 11 being wedged between the seat 23 and the ring 25. Inasmuch as the receptacle is thus grounded through the medium of the bottom element 10, the ring 25 is also grounded since as already explained it is secured to the receptacle 4 by means of the screws 26. Therefore, all of the exposed parts of the system are linked together and grounded to one side of the circuit, thus insuring protection against the potential of the system should any one touch any of the exposed parts.

By means of the invention, a standard form of receptacle is provided which is adapted to receive standard forms of equipment, the elements of which may be readily replaced, repaired or substituted one for another. Also by means of the invention the problem of wiring and of repairing defective parts is greatly simplified and consequently the cost of installation and the cost of maintenance are very materially reduced. Since the construction permits the cables to be drawn to the front of the wall, the connections to the bottom element and to the wiring device can be freely and easily made in the open and the work of installation and repair greatly facilitated and simplified. Consequently the cost of installation, repair and maintenance is greatly reduced.

The invention therefore makes it possible—First, to insure a good contact between the bottom element 10, the receptacle 4 and the cover ring 25 and through the bottom element 10 with the armor of the cable and with any conductor in the cable that may be connected with the bottom element 10. Second, to readily adjust the block 11 or other wiring device to bring it flush with the front wall, without the necessity of taking off the cover ring or plate, thus insuring economy in time and labor.

The structure of the support shown in Fig. 8 is not claimed in this application inasmuch as it is the subject of application Serial No. 391,899, filed in our names on the same day.

While we have elected to describe our invention with reference to a specific form of device such as illustrated in the drawing, we do not wish to be limited to such form, inasmuch as we contemplate variations and modifications within the spirit of the invention and the scope of the claims contained herein, which the disclosure will suggest to those versed in the art.

What we claim as new and desire to secure by Letters Patent of the United States, is:

1. A receptacle for a wiring system having a mouth and an opening, the latter being located in the rear of the receptacle and opposite the former, a base element for the receptacle, a seat in said receptacle for said base element, said seat being located about said opening, said mouth being larger than said base element whereby the said base element may be thrust through said mouth into the receptacle, said opening being smaller than said base element whereby said base element is prevented from passing through said opening and whereby it may be seated on its seat, and means for maintaining said base element on its seat, said means being secured to the receptacle above said base element, and being in the form of a U-shaped bracket, said bracket being inserted in the receptacle and secured in the region of the mouth thereof.

2. A receptacle for a wiring system having a mouth and an opening, the latter being located in the rear of the receptacle and opposite the former, a base element for the receptacle, a seat in said receptacle for said base element, said seat being located about said opening, said mouth being larger than said base element whereby said base element may be thrust through said mouth into the receptacle, said opening being smaller than said base element whereby said base element is prevented from passing through said opening and whereby it may be seated on its seat, an electric device mounted on said base element, a cover for said receptacle, adjustable means interposed between said base and said cover comprising the body of said electric device for moving said base element and electric device relatively to each other, said cover being provided with opening means through which said adjustable means may be operated.

3. In a wiring system, a receptacle having a mouth through which an electric device may be inserted and passage means through which one or a plurality of cables may pass freely, a base element adapted to be located in said receptacle having a plurality of openings each adapted to receive the end of a cable, means for fastening cable ends in said openings, means to connect a conductor of each cable to said base element, and means for fastening said base element in the receptacle.

4. In a wiring system, a receptacle having a mouth through which an electric device may be inserted and passage means through which one or a plurality of cables may pass freely, a base element adapted to be located in said receptacle having a plurality of openings each adapted to receive the ends of a cable, means for fastening cable ends in said openings, means to connect a conductor of each cable to said base element, means for fastening said base element in the receptacle, and means whereby an electric wiring device may be fastened in said receptacle.

5. In a wiring system, a receptacle having a mouth through which an electric device may be inserted and passage means through which one or a plurality of cables may pass freely, a base element adapted to be located in said receptacle having a plurality of openings each adapted to receive the end of a cable, means for fastening cable ends in said openings, means for fastening said base element in the receptacle, and means for fastening an electric wiring device to said base element, said last-named means being adjustable whereby the base element and wiring device may be adjusted relatively to each other to bring the face of the wiring device flush with a wall.

6. In a wiring system, the combination of a wall bracket having an opening, a receptacle adapted to be fastened in said opening, said receptacle having a mouth through which an electric device may be inserted and passage means through which one or a plurality of cables may pass freely, a base element, means whereby a plurality of cables may be attached to the base element, a wiring device, and means for fastening the base element and wiring device in the receptacle after the cables have been attached to the base element and the conductors of the cables have been attached to the wiring device, whereby the cable conductors may be attached to the wiring device in front of the receptacle, and the base element and the wiring device then fastened in the receptacle, the cables being pushed back through said passage means.

In witness whereof, we have hereunto set our hands this third day of September 1929.

GEORGE CARLSON.
HOMER G. KNODERER.